United States Patent
Shepherd et al.

(10) Patent No.: US 12,159,325 B2
(45) Date of Patent: Dec. 3, 2024

(54) ANONYMOUS PROCUREMENT OF TICKET VOUCHERS

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 17/563,845

(22) Filed: Dec. 28, 2021

(65) Prior Publication Data

US 2023/0206376 A1 Jun. 29, 2023

(51) Int. Cl.
G06Q 50/34 (2012.01)
G06Q 20/04 (2012.01)
G06Q 20/32 (2012.01)

(52) U.S. Cl.
CPC ......... *G06Q 50/34* (2013.01); *G06Q 20/0457* (2013.01); *G06Q 20/3255* (2013.01)

(58) Field of Classification Search
None
See application file for complete search history.

(56) References Cited

U.S. PATENT DOCUMENTS

| | | | |
|---|---|---|---|
| 7,680,712 B2* | 3/2010 | Thomson | G06Q 40/00 705/30 |
| 7,814,009 B1* | 10/2010 | Frenkel | G06Q 30/06 705/26.8 |
| 7,828,646 B2 | 11/2010 | Franks, Jr. | |
| 7,976,382 B2 | 7/2011 | Benbrahim | |
| 8,023,715 B2 | 9/2011 | Jones et al. | |
| 8,216,064 B1 | 7/2012 | Muskin | |
| 8,382,583 B2 | 2/2013 | Zinder et al. | |
| 8,407,141 B2 | 3/2013 | Mullen et al. | |
| 8,419,527 B2 | 4/2013 | Gagner et al. | |
| 8,556,707 B2 | 10/2013 | Beer et al. | |
| 8,595,137 B2 | 11/2013 | Sears et al. | |
| 8,734,236 B2 | 5/2014 | Arezina et al. | |
| 8,958,534 B2 | 2/2015 | Bodman | |
| 9,148,569 B2 | 9/2015 | Resende et al. | |
| 9,153,095 B2 | 10/2015 | Adiraju et al. | |
| 9,530,277 B2 | 12/2016 | Nelson et al. | |
| 9,552,573 B2 | 1/2017 | Kulpati et al. | |
| 9,672,686 B2 | 6/2017 | Nguyen | |
| 9,747,597 B2 | 8/2017 | Wu | |
| 9,990,801 B2 | 6/2018 | Sanford et al. | |

(Continued)

FOREIGN PATENT DOCUMENTS

WO 2014078696 A2 5/2014

*Primary Examiner* — William J Jacob
(74) *Attorney, Agent, or Firm* — Neal, Gerber & Eisenberg LLP

(57) ABSTRACT

Systems and methods that operate to, responsive to a request received from a user to obtain a ticket voucher with funds from an account external to a gaming establishment and responsive to a completion of a transfer of an amount of funds from a financial account and independent of identifying the user to any gaming establishment patron management system, such that an identity of the user remains anonymous to the gaming establishment, cause, based on the amount of funds, a modification of an account associated with a gaming establishment ticket voucher system and a creation, by the gaming establishment ticket voucher system, of the ticket voucher associated with the amount of funds.

20 Claims, 4 Drawing Sheets

(56) References Cited

U.S. PATENT DOCUMENTS

| | | | |
|---|---|---|---|
| 10,297,105 B2 | 5/2019 | Lemay et al. | |
| 10,402,815 B2 | 9/2019 | Sharma et al. | |
| 10,546,463 B2 | 1/2020 | Higgins et al. | |
| 10,573,129 B2 | 2/2020 | Higgins et al. | |
| 10,643,426 B2 | 5/2020 | Higgins et al. | |
| 10,810,835 B2 | 10/2020 | Higgins et al. | |
| 10,861,289 B1* | 12/2020 | Gordon | G07F 17/3225 |
| 10,916,090 B2 | 2/2021 | Miri et al. | |
| 10,950,088 B2 | 3/2021 | Petersen et al. | |
| 11,062,562 B2 | 7/2021 | Shepherd et al. | |
| 11,132,862 B2 | 9/2021 | Cleveland et al. | |
| 11,183,015 B2 | 11/2021 | Higgins et al. | |
| 2003/0017865 A1* | 1/2003 | Beaulieu | G07F 17/3213 |
| | | | 463/16 |
| 2003/0162591 A1 | 8/2003 | Nguyen et al. | |
| 2003/0187798 A1 | 10/2003 | Mckinley et al. | |
| 2003/0228907 A1* | 12/2003 | Gatto | G07F 17/32 |
| | | | 463/25 |
| 2004/0054623 A1 | 3/2004 | Collins et al. | |
| 2004/0058728 A1 | 3/2004 | Fayter et al. | |
| 2005/0021418 A1* | 1/2005 | Marcus | G06Q 30/06 |
| | | | 705/26.1 |
| 2005/0137016 A1* | 6/2005 | Enzminger | G07F 17/32 |
| | | | 463/42 |
| 2005/0227760 A1* | 10/2005 | Vlazny | G07F 17/3223 |
| | | | 463/28 |
| 2006/0154722 A1* | 7/2006 | Walker | G07F 17/3255 |
| | | | 463/25 |
| 2006/0205468 A1* | 9/2006 | Saffari | G07F 17/32 |
| | | | 463/16 |
| 2007/0087817 A1 | 4/2007 | Beer et al. | |
| 2007/0203832 A1 | 8/2007 | Babi et al. | |
| 2008/0153583 A1* | 6/2008 | Huntley | G07F 17/3281 |
| | | | 463/25 |
| 2009/0259560 A1* | 10/2009 | Bachenheimer | G06Q 20/4014 |
| | | | 705/26.1 |
| 2010/0183246 A1 | 7/2010 | King et al. | |
| 2012/0078792 A1 | 3/2012 | Bacastow et al. | |
| 2012/0252567 A1 | 10/2012 | Gagner et al. | |
| 2013/0103582 A1 | 4/2013 | Singfield | |
| 2013/0196747 A1 | 8/2013 | Nguyen | |
| 2013/0198071 A1 | 8/2013 | Jurss | |
| 2013/0223721 A1 | 8/2013 | Nepomniachtchi et al. | |
| 2014/0270463 A1 | 9/2014 | Narendra et al. | |
| 2015/0065231 A1 | 3/2015 | Anderson et al. | |
| 2015/0080113 A1 | 3/2015 | Yankton et al. | |
| 2015/0248806 A1 | 9/2015 | Mueller | |
| 2015/0286860 A1 | 10/2015 | Ruiz-Tapiador | |
| 2016/0044203 A1 | 2/2016 | Paul et al. | |
| 2016/0055322 A1* | 2/2016 | Thomas | H04L 63/0876 |
| | | | 726/7 |
| 2016/0171830 A1 | 6/2016 | Curtin et al. | |
| 2017/0092054 A1 | 3/2017 | Petersen et al. | |
| 2017/0092061 A1* | 3/2017 | Nelson | G07F 17/3244 |
| 2017/0140365 A1 | 5/2017 | Hameed et al. | |
| 2017/0154497 A1 | 6/2017 | Nguyen | |
| 2017/0213199 A1 | 7/2017 | Schwartz | |
| 2017/0262834 A1 | 9/2017 | Curtin et al. | |
| 2018/0047249 A1 | 2/2018 | Nelson et al. | |
| 2018/0061179 A1 | 3/2018 | Miri et al. | |
| 2018/0082529 A1 | 3/2018 | Mchugh et al. | |
| 2018/0211243 A1 | 7/2018 | Ekpenyong et al. | |
| 2019/0043308 A1 | 2/2019 | Higgins et al. | |
| 2019/0122492 A1* | 4/2019 | Nguyen | G07F 17/3241 |
| 2019/0156541 A1 | 5/2019 | Isgar | |
| 2019/0213832 A1 | 7/2019 | Tsutsui | |
| 2019/0272704 A1 | 9/2019 | Lemay et al. | |
| 2019/0332757 A1 | 10/2019 | Chen et al. | |
| 2021/0074109 A1 | 3/2021 | Depta et al. | |
| 2022/0193557 A1* | 6/2022 | Higgins | G06Q 20/30 |
| 2022/0318810 A1* | 10/2022 | Shepherd | G06Q 20/425 |

* cited by examiner

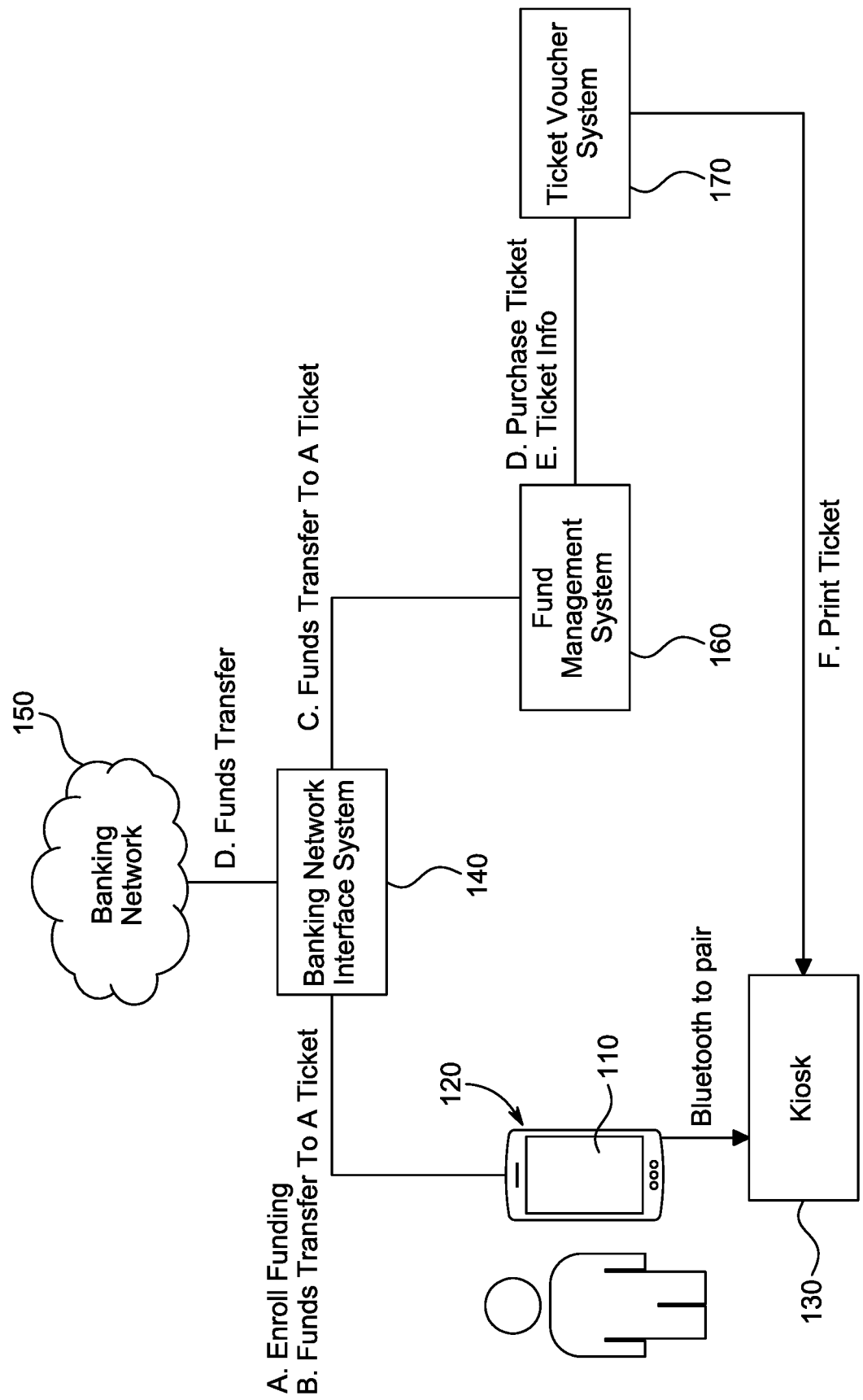

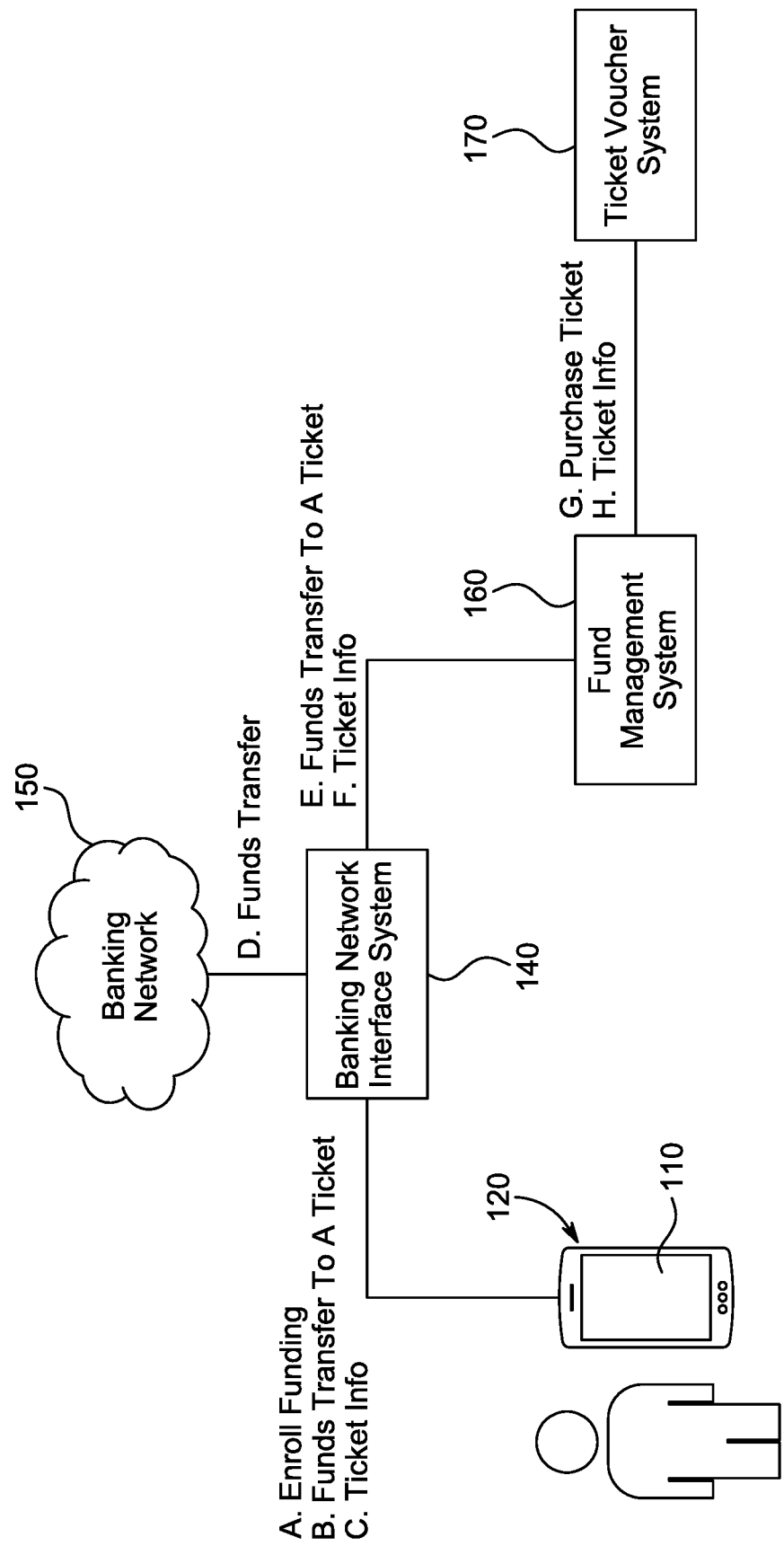

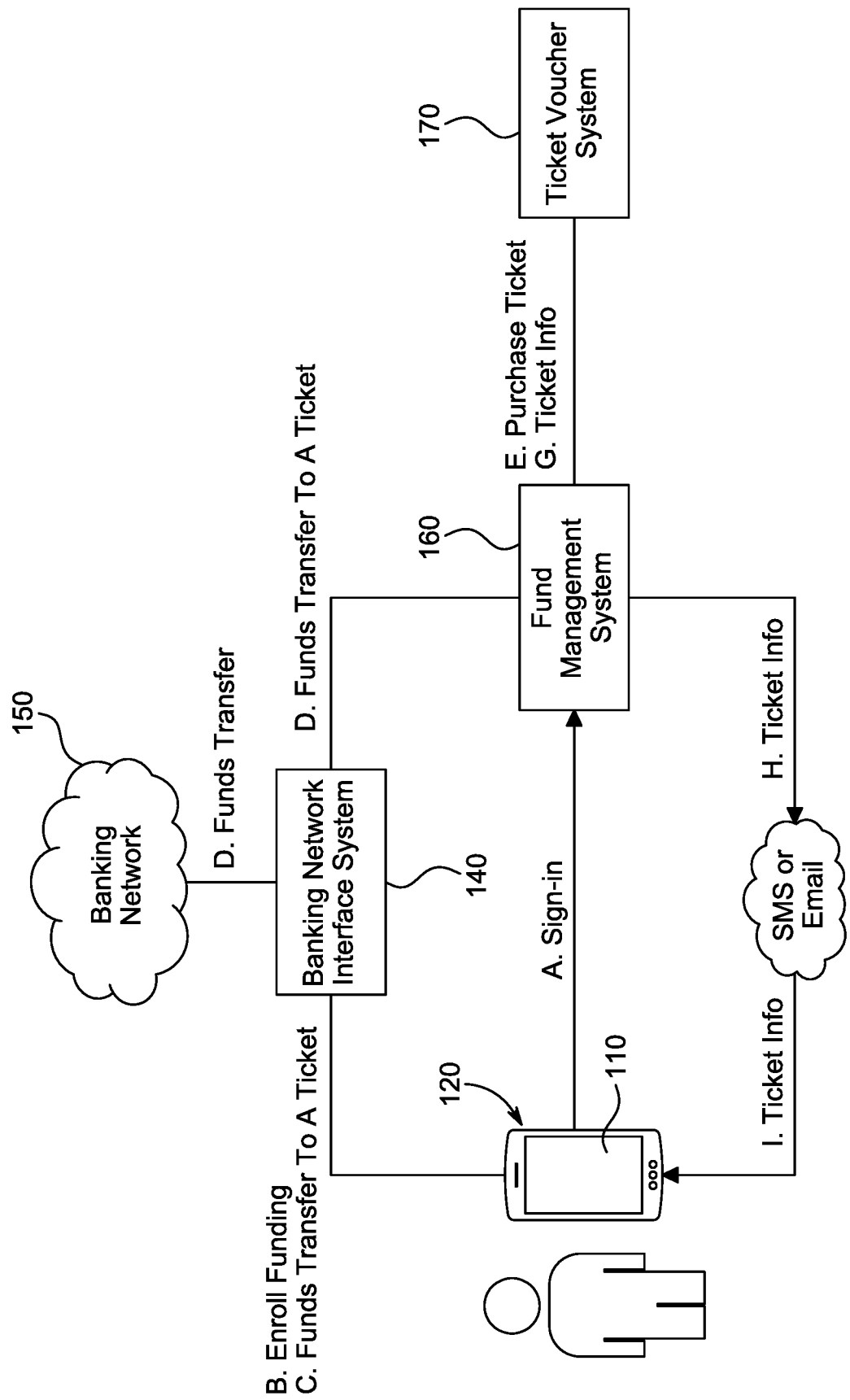

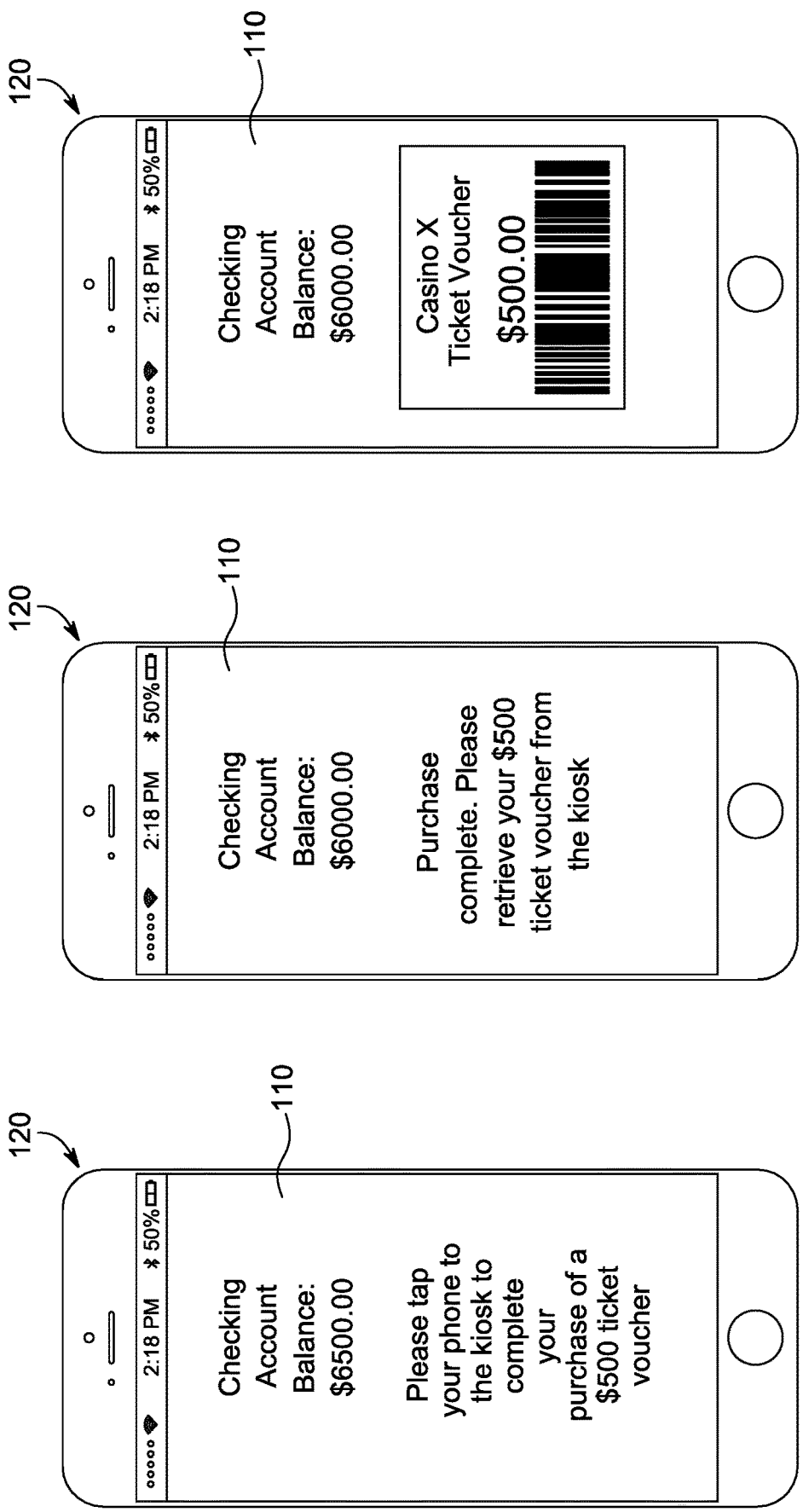

ANONYMOUS PROCUREMENT OF TICKET VOUCHERS

BACKGROUND

In various embodiments, the systems and methods of the present disclosure enable a user to obtain a ticket voucher with funds from an account external to a gaming establishment while an identity of the user remains anonymous to the gaming establishment.

Gaming machines may provide players awards in primary games. Gaming machines generally require the player to place a wager to activate the primary game. The award may be based on the player obtaining a winning symbol or symbol combination and on the amount of the wager. When a player cashes out a credit balance of such gaming machines, these gaming machines may provide the player with a ticket voucher redeemable for the amount of the credit balance.

BRIEF SUMMARY

In certain embodiments, the present disclosure relates to a system including a processor, and a memory device that stores a plurality of instructions. When executed by the processor responsive to a request received from a user to purchase a ticket voucher associated with an amount of funds, the instructions cause the processor to communicate, to a server of a financial institution, data associated with the amount of funds, and data associated with a financial account associated with the user, wherein the financial account is maintained by the financial institution independent of any gaming establishment. When executed by the processor responsive to a completion of a transfer of the amount of funds from the financial account and independent of identifying the user to any gaming establishment patron management system, the instructions cause the processor to cause, based on the amount of funds, a modification of an account associated with a gaming establishment ticket voucher system and a creation, by the gaming establishment ticket voucher system, of the ticket voucher associated with the amount of funds.

In certain embodiments, the present disclosure relates to a ticket voucher system including a processor, and a memory device that stores a plurality of instructions. When executed by the processor, the instructions cause the processor to receive, from a server of a fund management system, data associated with an amount of funds transferred from a financial account associated with a user, wherein the financial account is maintained by a financial institution independent of any gaming establishment. When executed by the processor following a modification of an account associated with the ticket voucher system based on the amount of funds transferred from the financial account associated with the user, the instructions cause the processor to create a ticket voucher associated with a value corresponding to the amount of funds transferred from the financial account, wherein the ticket voucher is created independent of identifying the user to any gaming establishment patron management system.

In certain embodiments, the present disclosure relates to a method of operating a system. Responsive to a request received from a user to purchase a ticket voucher associated with an amount of funds, the method includes communicating, to a server of a financial institution, data associated with the amount of funds, and data associated with a financial account associated with the user, wherein the financial account is maintained by the financial institution independent of any gaming establishment. Responsive to a completion of a transfer of the amount of funds from the financial account and independent of identifying the user to any gaming establishment patron management system, the method includes causing, by a processor and based on the amount of funds, a modification of an account associated with a gaming establishment ticket voucher system and a creation, by the gaming establishment ticket voucher system, of the ticket voucher associated with the amount of funds.

Additional features are described herein, and will be apparent from the following Detailed Description and the figures.

BRIEF DESCRIPTION OF THE SEVERAL VIEWS OF THE DRAWINGS

FIGS. 1A, 1B and 1C are schematic diagrams of the interactions between a mobile device and/or a kiosk, a ticket voucher system and a fund management system in association with a procurement of a ticket voucher of certain embodiments of the present disclosure.

FIGS. 2A, 2B, and 2C are example graphical user interfaces displayed on a mobile device in connection with procuring a virtual ticket voucher with funds from an external account.

DETAILED DESCRIPTION

In various embodiments, the systems and methods of the present disclosure enable a user to purchase a ticket voucher with funds from an account external from a gaming establishment while an identity of the user remains anonymous to the gaming establishment.

In certain embodiments, to procure a ticket voucher (e.g., an anonymous bearer instrument associated with an amount of funds and redeemable for cash via a kiosk, a cashier and/or game play on a gaming establishment device, such as an electronic gaming machine ("EGM")), the system enables a user to utilize funds from an external account maintained by an external funding source while remaining anonymous to a patron management system of a gaming establishment. That is, in view of certain gaming establishment patrons preferring that their identity remains anonymous to a gaming establishment and further in view of such gaming establishment patrons wanting to take advantage of eliminating their use of cash throughout the gaming establishment, the system of the present disclosure enables a user obtain a ticket voucher without the use of physical cash or checks by identifying themselves to an external funding source (in accordance with certain jurisdictional regulations) without also identifying themselves to the gaming establishment that issues the ticket voucher. In certain such embodiments, following the user identifying themselves to an external funding source without the user also identifying themselves to any gaming establishment patron management system, the system enables the user to access an external account maintained by the external funding source and initiate a transfer of funds from that external account. Following a completion of this transfer of funds from the external account, the system operates with a gaming establishment ticketing system to purchase a ticket voucher with the funds transferred from the external account. The purchased ticket voucher is then made available to the user (either as a printed ticket voucher or a virtual ticket voucher securely transferred to a mobile device associated with the user), all while bypassing the user identifying themselves to certain components of the gaming establishment.

It should thus be appreciated that given the conflict between the regulatory need to identify users whom embrace the use of electronic fund transfers to complete transactions at a gaming establishment and the anonymous nature (with respect to the gaming establishment) of the holder of a ticket voucher, the present disclosure enables a user to remain anonymous to a gaming establishment while obtaining funds via electronic fund transfers used to procure a ticket voucher and while complying with the regulatory need to identify themselves to certain control systems. The system of the present disclosure thus provides an alternative, non-cash-based option for a gaming establishment patron to procure a ticket voucher while complying with various anti-money laundering regulations which require the tracking of certain financial transactions associated with a gaming establishment patron (but do not currently specify that the gaming establishment is responsible for identifying the patron). As such, to further expand the cashless ecosystem certain gaming establishments strive for, the system of the present disclosure enables an anonymous patron (relative to the gaming establishment) the opportunity to procure a ticket voucher for an amount of funds that are independent of any amount of cash, relatively more secure than an amount of cash and in compliance with certain anti-money laundering regulations.

It should be further appreciated that since certain gaming establishment patrons are uncomfortable venturing into a gaming establishment with large amounts of cash and rather than requiring a user to procure a ticket voucher at an EGM, a kiosk or a gaming establishment interface, such as a cashier at a casino desk, using an amount of cash, the system enables a user to procure a ticket voucher for an amount of funds transferred from an external account without the need to handle cash. Such reduction in the use of cash at a gaming establishment provides a relatively more secure environment for a user (via reducing or eliminating a user carrying cash on their person to procure a ticket voucher and thus diminishing the risks that such cash may be lost or stolen), overcomes various health concerns associated with cash-based transactions (e.g., protecting patrons from using forms of currency that act as transmission vehicles for contagions), and benefits the gaming establishment by reducing the use of certain ticket voucher generating kiosks accepting cash (e.g., reducing the wear and tear on such devices and prolonging the operational life on these devices). Moreover, by reducing the amount of cash transactions in a gaming establishment via enabling the cash-free procurement of ticket vouchers, the system of the present disclosure reduces or eliminates human errors which often occur when ticket vouchers are purchased at gaming establishment interfaces, such as casino desks. Specifically, eliminating gaming establishment personnel from issuing ticket voucher in exchange for amounts of cash not only protects the user (if the gaming establishment personnel provides the gaming establishment patron a lower valued ticket voucher than the patron deserves) but also protects the gaming establishment (if the gaming establishment personnel inadvertently or fraudulently provides the patron a higher valued ticket voucher than the patron deserves).

In various embodiments, a fund management system of the present disclosure includes various components or subsystems operating together to cause an amount of funds from an external account associated with a user to be used to purchase a ticket voucher independent of requiring the user to identify themselves to a gaming establishment patron management system, such as a player tracking system.

In certain embodiments, the fund management system is in communication with one or more external funding sources which maintain one or more external accounts for a user. In different embodiments, such external funding sources that maintain such external accounts include, but are not limited to, one or more credit card accounts maintained by one or more financial institutions, one or more debit card accounts maintained by one or more banks or credit unions, one or more financial institution accounts, such as a brokerage account, savings account, or checking account, maintained by one or more financial institutions and/or one or more third-party maintained accounts (e.g., one or more PayPal® accounts or Venmo® accounts). For example, the fund management system operates with a banking network interface system (i.e., a financial institution network interface system) in communication a network of one or more banks or other financial institutions (i.e., banking networks) which operate to electronically transfer funds from the user's accounts maintained as such banks or financial institutions to the fund management system (and/or to the ticket voucher system associated with the fund management system). In certain embodiments, such a network of one or more banks or other financial institutions includes or is in communication with a payment processor which processes the movement of funds between one or more banking accounts which back the amount of funds associated with one or more ticket vouchers.

In certain embodiments, the fund management system is in communication with a ticket voucher system. The ticket voucher system includes one or more servers which store, in one or more databases, ticket voucher identification information associated with each ticket voucher created by the ticket voucher system, such as identifying information, value information, and/or activity information. In addition to maintaining information associated with each ticket voucher, in certain embodiments wherein the purchased ticket voucher takes the form of a paper ticket voucher, the ticket voucher system includes one or more ticket voucher system components, such as a ticket voucher printer configured to print purchased paper ticket vouchers. For example, a ticket voucher printer is associated with a kiosk that prints ticket vouchers purchased with funds from an external funding source. In certain other embodiments wherein a purchased ticket voucher takes the form of a virtual ticket voucher, the ticket voucher system includes one or more interfaces operable to communicate to a mobile device data associated with a virtual ticket voucher purchased with funds from an external funding source. It should be appreciated that in different embodiments, the system utilizes a mobile device running a mobile device application, a kiosk, an EGM, a remote host controller service window displayed by an EGM and/or a gaming establishment interface, such as a casino desk, to facilitate the transfer of funds between an external account, the fund management system and the ticket voucher system.

In certain embodiments, the fund management system is in communication with one or more credit systems that each issue a user one or more lines of credit or markers and/or one or more credit reporting/credit risk systems that monitor and report on various accounts associated with the user. It should be appreciated that while described as the fund management system being in communication with one or more credit systems and/or one or more credit reporting/credit risk systems, in different embodiments, any component or subsystem of the present disclosure can be in communication with one or more credit systems and/or one or more credit reporting/credit risk systems.

In various embodiments, prior to utilizing funds associated with an external account maintained by an external funding source to purchase a ticket voucher, the user enrolls an external account maintained by an external funding source to access such funds. In certain embodiments, if the user has not previously enrolled the external account and/or the external funding source with one or more components of the fund management system, the system enables the user to enroll the external account and/or the external funding source with the fund management system. For example, the system of the present disclosure enables a user to enroll a bank account with the fund management system using a mobile device application wherein such enrollment occurs independent of requiring the user to logon to the mobile device application or otherwise identify themselves to a gaming establishment patron management system. In this example, the user remains anonymous to the gaming establishment because the act of enrolling the bank account maintained by the bank is between the user, the mobile device application and the user's bank.

In various embodiments, to enroll an external account and/or an external funding source with a fund management system, the system enables a user to utilize an interface, such as a mobile device application being executed by a mobile device, a website accessed from a browser, a kiosk and/or a service window displayed by EGM (or other gaming establishment device), to attempt to complete the enrollment through one or more interactive forms. For example, as part of enrolling an external account and/or an external funding source with a fund management system, the user makes one or more inputs via an interface to provide certain user identifying information (such as, but not limited to, name, address, birthdate, state of birth, additional address details, a social security number and/or a mother's maiden name) and/or certain external account identifying information (such as, but not limited to, an identification of a funding source, an external account number, a unique username/password combination associated with the user to access the external account).

In certain embodiments, as part of enrolling an external account and/or an external funding source with a fund management system, the fund management system determines zero, one or more security measures to invoke in association with each transaction that uses funds from the external account. In these embodiments, to prevent unauthorized access to the funds associated with such an external account, the system applies such determined security measures in association with any transaction that attempts to use funds from the external account to purchase a ticket voucher. In certain embodiments, as part of enrolling an external account and/or an external funding source with a fund management system, the fund management system determines one or more spending controls or restrictions to associate with the external account wherein if such spending conditions are satisfied, the fund management system invokes one or more security measures. In these embodiments, to balance the need to prevent unauthorized access to the funds associated with such an external account against the need to provide a frictionless experience for users, the fund management system dynamically employs one or more security measures such that certain transactions that trigger the need employ enhanced security measures and certain transactions that do not trigger the need do not employ enhanced security measures. It should be appreciated that an enhanced security measure includes any form of security that was not otherwise associated with the transaction prior to the determination that the nature of the transaction warranted an additional degree of protection to combat any attempted fraud associated with the transaction. For example, if a user is required to enter a personal identification number for each attempted transfer of funds from an external account to purchase a ticket voucher regardless of any determination that the nature of the transaction warrants any additional degree of protection to combat any attempted fraud associated with the transaction, such a personal identification number would not qualify as an enhanced security measure. In another example, if a user is not required to enter a personal identification number for each attempted transfer of funds from an external account to purchase a ticket voucher but following a determination that the nature of the transaction warrants requiring the user to enter a personal identification number as an additional degree of protection to combat any attempted fraud associated with the transaction, such a personal identification number would qualify as an enhanced security measure.

In certain embodiments, following the enrollment of an external funding source and/or an external account associated with a user and the user indicating an amount of funds to transfer from the external account maintained by the external funding source, the system initiates a requested transfer of funds from the external funding source to purchase a ticket voucher.

In certain embodiments, responsive to a user requesting a purchase of a ticket voucher with funds from an external account, the fund management system requests an amount of funds to be transferred from the enrolled external account, such as an external banking account, to the ticket voucher system to purchase the requested ticket voucher. In these embodiments, upon a successful settlement of the transfer of funds from the external account, such as upon a successful settlement of funds received from a banking account via an automated clearing house ("ACH") transfer, the fund management system utilizes the funds to purchase a ticket voucher from the ticket voucher system.

In certain other embodiments, responsive to a user requesting a purchase of a ticket voucher with funds from an external account, the fund management system requests an amount of funds to be transferred from the enrolled external account, such as an external banking account, to a ticket voucher purchasing account of the fund management system (wherein such funds are then used to purchase the requested ticket voucher). In these embodiments, upon a successful settlement of the transfer of funds from the external account, such as upon a successful settlement of funds received from a credit card account, the fund management system utilizes a ticket voucher purchasing account of the fund management system to receive the funds transferred from the external account prior to using such funds to purchase a ticket voucher from the ticket voucher system.

It should be appreciated that in certain embodiments, the external account is associated with a transaction completion time (i.e., an amount of time a financial institution associated with the external account needs to approve or disapprove the fund transfer and make the amount of funds available) wherein the purchase of the ticket voucher occurs following the transaction completion time. As such, since different external accounts are associated with different transaction completion times, the user may enroll different external accounts and utilize the funds from different external accounts to purchase ticket vouchers at different points in time based on the respective transaction completion times of these different external accounts. For example, days prior to an expected use of a purchased ticket voucher and aware of the time required to complete a transfer from a banking account, the user may enroll a banking account (i.e., an external account associated with a relatively longer transaction completion time) and/or access that banking account to request funds to purchase a ticket voucher independent of the user identifying themselves to a player tracking system of a gaming establishment. In another example, if the user wants relative immediate access to funds from an external account to purchase a ticket voucher for relative immediate use, the user may enroll a credit card account (i.e., an external account associated with a relatively shorter transaction completion time) and/or access that credit card account to request funds to purchase a ticket voucher independent of the user identifying themselves to a player tracking system of a gaming establishment.

In certain embodiments, the system enables the user to remain anonymous to the gaming establishment patron management system and to log into an enrolled external account maintained by the external funding source (and/or log into the fund management system in communication with the external funding source) via inserting or swiping a magnetic striped card, such as a credit card or debit card, at a card reader associated with a kiosk at which the user will purchase the ticket voucher. In certain embodiments, the system enables the user to remain anonymous to the gaming establishment patron management system and to log into an enrolled external account maintained by the external funding source (and/or log into the fund management system in communication with the external funding source) via entering a card number of their card, such as a credit card or a debit card, at an input device, such as a keypad, associated with the kiosk.

In certain embodiments wherein a kiosk is employed to transfer funds from an external account to purchase a ticket voucher, the kiosk enables the user to input data for accessing the external account and/or information regarding the amount of the ticket voucher to purchase using one or more input devices of the kiosk. In certain other embodiments wherein a kiosk is employed to transfer funds from an external account to purchase a ticket voucher, the kiosk receives data for accessing the external account and/or information regarding the amount of the ticket voucher to purchase from a mobile device associated with the user. In these embodiments, following the launching of the mobile device application, such as following the user selecting an image associated with the account stored via a digital wallet application or following the mobile device application retrieving data associated with an account stored via a digital wallet application, the mobile device application prompts the user to cause the mobile device to engage a kiosk, such as prompting the user to tap the mobile device to a card reader or other designated location(s) of the kiosk. After such engagement (or after the launching of the mobile device application if no mobile device to kiosk engagement is required), the mobile device application communicates, via a wireless communication protocol, data for accessing the external account stored by the mobile device to the kiosk. In different embodiments, such data is communicated from the mobile device to the kiosk via one or more wireless communication protocols including, but not limited to: Bluetooth™, Bluetooth™ Low Energy ("BLE"), one or more cellular communication standards (e.g., 3G, 4G, 5G, 6G, LTE), one or more Wi-Fi compatible standards, and one or more short range communication protocols (e.g., a near field communication ("NFC") protocol). It should be appreciated that in different embodiments, the data for accessing the external account includes data identifying the external account and/or data identifying the user, such as, but not limited to, the user's unique username and password combination, biometric data received by a biometric sensor (e.g., a fingerprint sensor, a retinal sensor, a voice sensor, or a facial-recognition sensor) of the mobile device and/or the kiosk, and/or any other suitable identifying information.

Following the kiosk receiving the data for accessing the external account (either from the mobile device, a server in communication with the mobile device, or from the user independent of the mobile device), the kiosk of this embodiment proceeds with operating with one or more fund management system components that operate to log the user into the external account to initiate any transfers of funds from such an external account. That is, to transfer funds from an external account in accordance with various embodiments of the present disclosure, one or more components of the fund management system operate or otherwise interface with one or more components of an external funding source to request an amount of funds subsequently used to anonymously (relative to the gaming establishment) purchase a ticket voucher. For example, one or more servers of the fund management system communicates data regarding the requested transfer of funds to one or more servers of a financial institution that maintains the external account. In this example, the one or more servers of the financial institution determine whether or not to complete the requested transfer of funds. If the determination is to not complete the requested transfer of funds (i.e., the external account lacks adequate funds to cover the requested transfer and the requested transfer is otherwise in violation of one or more rules and regulations), the one or more servers of the financial institution denies the requested transfer of funds and communicates data to the one or more servers of the fund management system of the denied transfer (which in turn communicate data to the kiosk and/or the mobile device of the denied transfer of funds to display one or more messages to the user).

On the other hand, if the determination is to complete the requested transfer of funds (i.e., the external account has adequate funds to cover the transfer and the requested transfer is otherwise in compliance with zero, one or more rules and regulations), the one or more servers of the financial institution completes the transfer and communicates data to the one or more servers of the fund management system of the completed transfer. Following the completed transfer of funds from the external account, the fund management system operates with the ticket voucher system to purchase a ticket voucher.

To purchase a ticket voucher in accordance with various embodiments of the present disclosure, the fund management system transfers the funds from the external account to an account associated with the ticket voucher system and the ticket voucher system issues a ticket voucher associated with that amount of funds. The ticket voucher system updates one or more ticket voucher databases to reflect this transaction wherein the ticket voucher database and/or the ticket voucher includes or is otherwise associated with different identifying information which is identifiable to a holder of the ticket voucher, such as a ticket voucher validation number, and an amount of funds associated with the ticket voucher. In different embodiments, the ticket voucher database and/or the ticket voucher includes or is otherwise associated with various fields of ticket voucher identifying information including, but not limited to: (i) a primary key (i.e., an index for a record in a table); (ii) a ticket voucher validation number (i.e., the validation number associated with the issued ticket); (iii) a ticket state (e.g., a state of a ticket as being in an issued state or a redeemed state); (iv) an issuance date/time (i.e., the date/time when the ticket voucher was issued); (v) a property address associated with the ticket voucher issuance; (vi) an amount of funds associated with the ticket voucher; (vii) any expiration date associated with the ticket voucher; (viii) a device identification associated with the issuance of the ticket voucher; (ix) an image of the ticket voucher (e.g., an image of a front of the ticket voucher and/or an image of a back of the ticket voucher); (x) any redemption date (i.e., the date the ticket voucher was redeemed at (if the ticket voucher is in the redeemed state)); (xi) redeemed at (i.e., the device where the ticket voucher was redeemed (if the ticket voucher is in the redeemed state)); (xii) a data signature (i.e., a signature of the data associated with the ticket voucher to prevent tampering by casino employees); and/or (xiii) a machine identification (i.e., an asset or machine number of the device that printed the ticket voucher).

In certain embodiments wherein the system employs a kiosk to facilitate the procurement of a ticket voucher with funds from an external account, following the purchase of the ticket voucher, the ticket voucher system communicates data associated with the purchased ticket voucher to the kiosk. In certain embodiments wherein the purchased ticket voucher will take the form of a paper ticket voucher, upon receipt of such data, a ticket printer of the kiosk operates to print the ticket voucher purchased with the funds transferred from the external account. For example, as seen in FIG. 1A (which illustrates certain interactions between a mobile device application 110 being executed by a mobile device 120, a kiosk 130, a banking network interface system 140 in communication with a banking network 150, a fund management system 160 and a ticket voucher system 170), following the enrollment of an external funding source with the banking network interface system, the user pairs a mobile device with a kiosk and uses the paired mobile device (and/or facilities exposed by the kiosk) to access the external account and request a fund transfer from the external account without the user otherwise identifying themselves to a gaming establishment patron management system. In this illustrated example, following the approval of the transfer of the requested funds from the external account, the funds are transferred to the external funding system resulting in a purchased ticket voucher from the ticket voucher system. Following such a purchase of a ticket voucher, the ticket voucher system transfers data associated with the purchased ticket voucher to the kiosk which prints the purchased ticket voucher for use by the user. For example, as seen in FIG. 2A, to enable a user to make a purchase of a ticket voucher for $500 without identifying themselves to a gaming establishment patron tracking system, a mobile device application 110 of a mobile device 120 enables a user to access an enrolled bank account via inputting user identifying information, such as a username and password. In this example, following the access of the enrolled bank account and the financial institution that maintains the bank account enabling the mobile device application to display the current account balance of the bank account, the mobile device application enables the user to input an amount of funds to be used to purchase a ticket voucher. Following the user making one or more inputs to initiate the transfer of $500 from the banking account to be used to purchase a $500 ticket voucher, the mobile device application instructs the user to tap the mobile device to the kiosk to complete the $500 purchase of a ticket voucher. In this example, as seen in FIG. 2B, following the pairing of the mobile device and the kiosk, the different components of the system operate to purchase a $500 ticket voucher (which a ticket voucher printer of the kiosk prints for the user) wherein following the purchase, the financial institution that maintains the bank account updates the account balance of the bank account and enables the mobile device application to display the updated account balance of the bank account.

In certain embodiments, the system enables the user to remain anonymous to the gaming establishment patron management system and to log into an enrolled external account maintained by the external funding source (and/or log into the fund management system in communication with the external funding source) via utilizing a mobile device application that transacts with the external funding system. In these embodiments, the external funding system transacts with the banking network interface system and the ticket voucher system to procure, using funds from the external account, a ticket voucher validation number (and/or other purchased ticket voucher supporting data) which is communicated to the mobile device application. In certain embodiments wherein the purchased ticket voucher will take the form of a paper ticket voucher, the mobile device interfaces with a kiosk wherein upon receipt and authentication of the ticket voucher validation number (and/or other purchased ticket voucher supporting data), a ticket printer of the kiosk operates to print the ticket voucher purchased with the funds transferred from the external account.

In certain embodiments, the system enables the user to remain anonymous to the gaming establishment patron management system and to log into an enrolled external account maintained by the external funding source (and/or log into the fund management system in communication with the external funding source) via utilizing a mobile device application that transacts with the external funding system and the ticket voucher system. In these embodiments, the external funding system transacts with the banking network interface system to procure, using funds from the external account, a transaction identifier which is communicated to the mobile device. Such a transaction identifier may then be provided to a kiosk (via any suitable wireless communication protocol and/or via the use of one or more machine-readable codes, such as QR codes) which interfaces with the external funding system by providing the transaction identifier received from the mobile device. The external funding system then return information about the purchased ticket voucher associated with the transaction. In certain embodiments wherein the purchased ticket voucher will take the form of a paper ticket voucher, a ticket printer of the kiosk operates to print the ticket voucher purchased with the funds transferred from the external account.

In certain embodiments that operate independent of any kiosk, the system enables the user to remain anonymous to the gaming establishment patron management system and to log into an enrolled external account maintained by the external funding source (and/or log into the fund management system in communication with the external funding source) via utilizing a mobile device application in communication with the banking network interface system. In these embodiments wherein a mobile device is employed to transfer funds from an external account to purchase a virtual ticket voucher to be associated with the mobile device, following the launching of the mobile device application, the mobile device application communicates, via a wireless communication protocol, external account data stored by the mobile device to one or more fund management system components that operate to log the user into the external account to initiate any transfers of funds from such an external account to purchase a virtual ticket voucher. For example, as seen in FIG. 1B (which illustrates certain interactions between a mobile device application 110 being executed by a mobile device 120, a banking network interface system 140 in communication with a banking network 150, a fund management system 160 and a ticket voucher system 170), following the enrollment of an external funding source with the banking network interface system, the user utilizes the mobile device of the mobile device to access the external account and request a fund transfer from the external account without the user otherwise identifying themselves to a gaming establishment patron management system. In this illustrated example, following the approval of the transfer of the requested funds from the external account, the funds are transferred to the external funding system resulting in a purchased virtual ticket voucher from the ticket voucher system. As further seen in FIG. 1B, the ticket voucher system (and/or the banking network interface system and/or the external funding system) transfers data associated with the purchased virtual ticket voucher to the mobile device for storage and subsequent use by the user. For example, as seen in FIG. 2C, following the user accessing an enrolled bank account via a mobile device application and following the purchase of a $500 virtual ticket voucher, the ticket voucher system (and/or the fund management system) operate to communicate the $500 virtual ticket voucher to the mobile device.

In certain other embodiments that operate independent of any kiosk, the system enables the user to remain anonymous to the gaming establishment patron management system and to log into an enrolled external account maintained by the external funding source (and/or log into the fund management system in communication with the external funding source) via utilizing a mobile device application in communication with the gaming establishment fund management system. In these embodiments wherein a mobile device is employed to transfer funds from an external account to purchase a virtual ticket voucher to be associated with the mobile device, following the launching of the mobile device application, the mobile device application communicates, via a wireless communication protocol, external account data stored by the mobile device to one or more fund management system components, which operate to log the user into the external account to initiate any transfers of funds from such an external account to purchase a virtual ticket voucher. For example, as seen in FIG. 1C (which illustrates certain interactions between a mobile device application 110 being executed by a mobile device 120, a banking network interface system 140 in communication with a banking network 150, a fund management system 160 and a ticket voucher system 170), following the enrollment of an external funding source with the banking network interface system, the user utilizes the mobile device of the mobile device to access the external account and request a fund transfer from the external account without the user otherwise identifying themselves to a gaming establishment patron management system. In this illustrated example, following the approval of the transfer of the requested funds from the external account, the funds are transferred to the external funding system resulting in a purchased virtual ticket voucher from the ticket voucher system. As further seen in FIG. 1C, the external funding system then communicates the purchased virtual ticket voucher to the user's mobile device via e-mail, SMS or text messages.

It should be appreciated that regardless of if the ticket voucher purchased with funds from an external account take the form of a paper ticket voucher or a virtual ticket voucher, such a ticket voucher is procured by the user independent of the user having to identify themselves to any gaming establishment patron management systems, such as any player tracking systems. As such, and in view of the competing interests between the regulatory need to identify users whom embrace the use of electronic fund transfers to complete transactions at a gaming establishment and the anonymous nature (with respect to the gaming establishment) of the holder of a ticket voucher, the system of the present disclosure enables a user to remain anonymous to a gaming establishment while obtaining funds via electronic fund transfers used to procure a ticket voucher and while complying with the regulatory need to identify themselves to certain control systems. The system of the present disclosure thus provides an alternative, non-cash-based option for a gaming establishment patron to procure a ticket voucher while complying with various anti-money laundering regulations which require the tracking of certain financial transactions associated with a gaming establishment patron (but do not currently specify that the gaming establishment is responsible for identifying the patron).

In certain embodiments, the system utilizes one mobile device application to interact with the different components of the fund management system to access funds to purchase ticket vouchers. For example, utilizing the same mobile application, a mobile device interacts with a banking network interface system and the ticket voucher system in communication with the fund management system. In certain embodiments, the system utilizes multiple mobile device applications to interact with the different components of the fund management system to access funds to purchase ticket vouchers. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a machine-readable code, such as a QR code).

It should be appreciated that in different embodiments, in addition to or alternatively from utilizing a mobile device running a mobile device application and/or a kiosk to access funds to purchase ticket vouchers and without having to identify themselves to a gaming establishment patron management system, the system utilizes an EGM (e.g., a slot machine, a video poker machine, a video lottery terminal, a terminal associated with an electronic table game, a terminal associated with a live table game, a video keno machine, a video bingo machine and/or a sports betting terminal (that offers sports betting opportunities and, in certain instances, wagering games)), a remote host controlled service window displayed by an EGM, a display device/input device associated with a seat-level gaming table component, a display device/input device associated with a table-level gaming table component, and/or a display device/input device associated with a mobile gaming table component to access such funds to purchase ticket vouchers. It should be further appreciated that while described in certain embodiments as using a mobile device running a mobile device application to access funds to purchase ticket vouchers, a physical instrument, such as a smart card or a user issued magnetic striped card may additionally or alternatively be utilized in association with one or more components of the system of the present disclosure to enable a user to access funds to purchase ticket vouchers without the user having to identify themselves to a gaming establishment patron management system.

Following the purchase of the ticket voucher, the system enables the purchased ticket voucher to be redeemed in association with one or more devices of a gaming establishment, such as at an EGM, a ticket voucher redemption kiosk and/or at a point-of-sale terminal that accepts ticket vouchers. In certain such embodiments wherein the purchased ticket voucher takes the form of a paper ticket voucher, the system enables a user to redeem the paper ticket voucher at a gaming establishment device, such as an EGM or a ticket voucher redemption kiosk via presenting the paper ticket voucher to a bill validator of the gaming establishment device. In these embodiments, following the presentation of the paper ticket voucher, the gaming establishment device (and/or a component of the gaming establishment device) interfaces with the ticket voucher system to verify that the presented paper ticket voucher is valid. If the presented paper ticket voucher is verified as valid, a server of the ticket voucher system updates a database of ticket vouchers to reflect the redemption of the presented ticket voucher. In certain instances, if the gaming establishment device provides wagering opportunities, such as an EGM, the gaming establishment device then proceeds with updating a credit balance of the gaming establishment device to account for the amount of funds associated with the presented ticket voucher, and the amount of funds associated with the presented ticket voucher are available for wagering by the user.

In certain other embodiments wherein the purchased ticket voucher takes the form of a virtual ticket voucher associated with a mobile device, the system enables a user to redeem the virtual ticket voucher at a gaming establishment device, such as at an EGM, a ticket voucher redemption kiosk and/or at a point-of-sale terminal, by employing the mobile device. In these embodiments, following the launching of the mobile device application, the mobile device application enables the user to select one or more images representing one or more virtual ticket vouchers associated with the mobile device. In these embodiments, following the determination of which virtual ticket vouchers are to be transferred from the mobile device application to the gaming establishment device, the mobile device application prompts the user to cause the mobile device to engage the gaming establishment device. The mobile device application then communicates, via a wireless communication protocol, data associated with the selected virtual ticket voucher to be transferred to the gaming establishment device, such that the gaming establishment device functions as if a paper ticket voucher were inserted into the bill validator of the gaming establishment device. In these embodiments, upon the gaming establishment device determining that a virtual ticket voucher was presented, the gaming establishment device interfaces with the ticket voucher system (or a slot machine interface board ("SMIB") which in turn will interface with the ticket voucher system), to redeem the ticket voucher via requesting the selected virtual ticket voucher (and more specifically the amount of funds associated with the selected virtual ticket voucher) be transferred to the gaming establishment device. In association with the attempted redemption of a virtual ticket voucher, one or more servers of the ticket voucher system determines whether to authorize the transfer of the selected virtual ticket voucher. If the transfer of the selected virtual ticket voucher is authorized, the server of the ticket voucher system updates a database of virtual ticket vouchers to reflect the redemption of the selected virtual ticket voucher. In certain instances, if the gaming establishment device provides wagering opportunities, such as an EGM, the gaming establishment device then proceeds with updating a credit balance of the gaming establishment device to account for the amount of funds associated with the selected virtual ticket voucher, and the amount of funds associated with the selected virtual ticket voucher are available for wagering by the user.

It should be appreciated that any functionality or process of the present disclosure may be implemented via one or more servers (associated with or independent of any component of any system of the present disclosure), one or more gaming establishment devices (e.g., a gaming device such as an EGM or a non-gaming device such as a kiosk or point-of-sale terminal), one or more components of a gaming establishment device (such as a component of a gaming establishment management system supported by or otherwise located inside the gaming establishment device), or a mobile device application. For example, while certain data or information of the present disclosure is explained as being communicated from a gaming establishment device, or a component associated with a gaming establishment device to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a gaming establishment device or a component associated with a gaming establishment device, such functions, features or processes may alternatively be performed by one or more servers, or one or more mobile device applications, or one or more gaming establishment components, (ii) while certain functions, features or processes are described herein as being performed by one or more mobile device applications, such functions, features or processes may alternatively be performed by one or more servers, one or more gaming establishment devices, one or more components of a gaming establishment device, or one or more gaming establishment components, (iii) while certain functions, features or processes are described herein as being performed by one or more servers, such functions, features or processes may alternatively be performed by one or more gaming establishment devices, one or more components of a gaming establishment device, one or more mobile device applications, or one or more gaming establishment components, and (iv) while certain functions, features or processes are described herein as being performed by one or more gaming establishment components, such functions, features or processes may alternatively be performed by one or more gaming establishment devices, one or more components of a gaming establishment device, or one or more servers.

As indicated above, in various embodiments, one or more actions occur between a mobile device and one or more components of the fund management system, the ticket voucher system, and/or the banking network interface system via one or more wireless communication protocols between the mobile device and the component of the fund management system, the component of the ticket voucher system, the component of the banking network interface system, and/or the gaming establishment device. In certain embodiments, the communication with the mobile device can occur through one or more wireless interfaces of the component of the fund management system, the component of the ticket voucher system, the component of the banking network interface system, and/or the gaming establishment device. In one embodiment, the wireless interface is integrated into the cabinet of the component of the fund management system, the component of the ticket voucher system, the component of the banking network interface system, and/or the gaming establishment device and a processor of the component of the fund management system, the component of the ticket voucher system, the component of the banking network interface system, and/or the gaming establishment device is configured to communicate directly with and send control commands to the wireless interface. In another embodiment, the wireless interface is integrated into a device mounted to and/or within the cabinet of the component of the fund management system, the component of the ticket voucher system, the component of the banking network interface system, and/or the gaming establishment device. In certain embodiments where the wireless interface is embedded in a secondary device, the processor of the component of the fund management system, the component of the ticket voucher system, the component of the banking network interface system, and/or the gaming establishment device sends control commands to control the wireless interface via a secondary controller.

In certain embodiments which utilize a near field communication (NFC) implementation, the mobile device application registers a mobile device application with one or more processors of the mobile device. In these embodiments, when the mobile device is detected by an NFC reader of a component of the fund management system, the component of the ticket voucher system, the component of the banking network interface system, and/or the gaming establishment device, the component of the fund management system, the component of the ticket voucher system, the component of the banking network interface system, and/or the gaming establishment device, such a component/device communicates one or more data messages to the mobile device (or to one or more servers which then communicate such data messages to the mobile device). Such data messages are commands generated by the component of the fund management system, the component of the ticket voucher system, the component of the banking network interface system, and/or the gaming establishment device when the mobile device is detected in the NFC reader field. The processor of the mobile device communicates the data message to the mobile device application. The mobile device application responds, such as communicating a triggering message, and a communication channel is opened between the component of the fund management system, the component of the ticket voucher system, the component of the banking network interface system, and/or the gaming establishment device and the mobile device application (or between the component of the fund management system, the component of the ticket voucher system, the component of the banking network interface system, and/or the gaming establishment device, one or more servers and the mobile device application). This open communication channel enables the component of the fund management system, the component of the ticket voucher system, the component of the banking network interface system, and/or the gaming establishment device to send, through the NFC reader, additional data messages to the mobile device (or to the mobile device via one or more servers) which are responded to by the mobile device application of the mobile device. It should be appreciated that as long as the mobile device remains within the NFC field, the component of the fund management system, the component of the ticket voucher system, the component of the banking network interface system, and/or the gaming establishment device is configured to communicate with the mobile device and send data, such as status updates, as necessary. However, once the mobile device is removed from the NFC field, the communication channel is closed and such status updates must be discontinued.

In other embodiments, the wireless interface implements a Wi-Fi, cellular and/or Bluetooth™ communications protocol to facilitate the communication of data between the mobile device and the component of the fund management system, the component of the ticket voucher system, the component of the banking network interface system, and/or the gaming establishment device. In such embodiments, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol enables for a Wi-Fi device pair directly with another without having to first join a local network.

It should be appreciated that Wi-Fi, cellular or Bluetooth™ communication protocols can be used in lieu of or in combination with NFC. For instance, an NFC communication can be used to instantiate a Wi-Fi or Bluetooth™ communication between the component of the fund management system, the component of the ticket voucher system, the component of the banking network interface system, and/or the gaming establishment device, zero, one or more servers and a mobile device, such as secure pairing using one of these protocols. That is, in one embodiment, an NFC interface on a component of the fund management system, the component of the ticket voucher system, the component of the banking network interface system, and/or the gaming establishment device and/or the gaming establishment device can be used to set-up a higher speed communication between the component of the fund management system, the component of the ticket voucher system, the component of the banking network interface system, and/or the gaming establishment device, zero, one or more servers and the NFC enabled mobile device. The higher speed communication rates can be used for expanded content sharing. For instance, a NFC and Bluetooth enabled component of the fund management system, the component of the ticket voucher system, the component of the banking network interface system, and/or the gaming establishment device can be tapped by an NFC and Bluetooth enabled mobile device for instant Bluetooth pairing between the devices and zero, one or more servers. Instant Bluetooth pairing between a component of the fund management system, the component of the ticket voucher system, the component of the banking network interface system, and/or the gaming establishment device, an NFC enabled mobile device and zero, one or more servers, can save searching, waiting, and entering codes. In another example, a component of the fund management system, the component of the ticket voucher system, the component of the banking network interface system, and/or the gaming establishment device can be configured as an NFC enabled router, such as a router supporting a Wi-Fi communication standard. Tapping an NFC enabled mobile device to an NFC enabled and Wi-Fi enabled component of the fund management system, the component of the ticket voucher system, the component of the banking network interface system, and/or the gaming establishment device can be used to establish a Wi-Fi connection between the components/devices and zero, one or more servers.

In certain embodiments which implement a Wi-Fi, cellular and/or Bluetooth™ communications protocol, the system utilizes one or more QR codes generated by the component of the fund management system, the component of the ticket voucher system, the component of the banking network interface system, and/or the gaming establishment device to facilitate the communication of data between the mobile device and the system. In such embodiments, the QR code is used to identify the component of the fund management system, the component of the ticket voucher system, the component of the banking network interface system, and/or the gaming establishment device that is displaying the QR code to identify the server to which the mobile device should connect. It should be appreciated that the QR code enables the system to establish a secure tunnel or path from the mobile device to the gaming establishment's Wi-Fi network and then to the gaming establishment's wired network and finally to the component of the fund management system, the component of the ticket voucher system, the component of the banking network interface system, and/or the gaming establishment device. In these embodiments, a communication tunnel wrapper (i.e., a Wi-Fi/Bluetooth™ tunnel wrapper) is utilized to establish a connection between the system and the mobile device and to transport any data messages described herein between the component of the fund management system, the component of the ticket voucher system, the component of the banking network interface system, and/or the gaming establishment device, zero, one or more servers and the mobile device.

More specifically, in certain embodiments, the user requests, via an input at the component of the fund management system, the component of the ticket voucher system, the component of the banking network interface system, and/or the gaming establishment device and/or the mobile device, the generation of a QR code by the component of the fund management system, the component of the ticket voucher system, the component of the banking network interface system, and/or the gaming establishment device. In response to the user's request, the component of the fund management system, the component of the ticket voucher system, the component of the banking network interface system, and/or the gaming establishment device displays a QR code. In certain embodiments, the QR code includes a nonce which prevents a third-party (e.g., another user) from sniping the user's login attempt. Such an on-demand QR code remains valid for a designated amount of time such that if the user does not scan the QR code within the designated amount of time, another QR code is necessary to be scanned to connect the mobile device to the component of the fund management system, the component of the ticket voucher system, the component of the banking network interface system, and/or the gaming establishment device.

In these embodiments, the user scans the QR code with the mobile device application. If the system determines that the QR code is valid (i.e., not expired), the mobile device application will connect to the system. It should be appreciated that as long as the established connection between the mobile device and the system remains active, one or more system servers and mobile device may communicate data, such as status updates, as necessary. It should be further appreciated that in association with the Wi-Fi or Bluetooth™ or mobile device network communications protocol described herein, any action requested by the user via the mobile device application does not require a new engagement between the mobile device and the component of the fund management system, the component of the ticket voucher system, the component of the banking network interface system, and/or the gaming establishment device, such as a new scanning of the QR code to send such a requested action from the mobile device to the component of the fund management system, the component of the ticket voucher system, the component of the banking network interface system, and/or the gaming establishment device (or to send a requested action from the mobile device to one or more servers and then from one or more servers to the component of the fund management system, the component of the ticket voucher system, the component of the banking network interface system, and/or the gaming establishment device).

In certain embodiments, following the scanning of a valid QR code, the mobile device application connects to one or more servers. In certain embodiments, after establishing a connection with one or more servers, the mobile device application transmits a connect command to the system. In response to receiving a connect command from the mobile device, the system sends a message to the mobile device. This message serves to encapsulate various commands between the system and the mobile device. In these embodiments, if the mobile device application does not receive this message within a designated period of time, such as within five seconds, the mobile device application displays an error message to the user and directs the user to rescan the QR code.

In addition to the connect command communicated from the mobile device application to the system, the mobile device application of these embodiments is configured to send a disconnect command to the system. Such a disconnect command functions to tear-down the connection the server. It should be appreciated that if the mobile device connection is severed before this command is received by the system, the sever sends this command on behalf of the mobile device application;

In another embodiment, the mobile device application is configured to send a trigger command to the system, such as a component of the fund management system, the component of the ticket voucher system, the component of the banking network interface system, and/or the gaming establishment device. In this embodiment, the trigger command is associated with an action requested by the user. In such embodiments, when the system receives the trigger command from the mobile device application, the system will communicate the appropriate requests to the mobile device application. If the mobile device application does not receive these requests within a designated amount of time, such as five seconds, the mobile device application will display an error message to the user and enable the user to retry the requested action.

In other embodiments, the mobile device application communicates with the system through a tunnel established over the mobile device's Wi-FI network or the mobile device's network connection. In such embodiments, the mobile device application will connect to one or more system servers which use websockets secured with a transport layer security protocol. The system server operates with one or more translators, similarly using websockets secured with a transport layer security protocol to communicate data to the component of the fund management system, the component of the ticket voucher system, the component of the banking network interface system, and/or the gaming establishment device.

In certain embodiments which utilize the NFC communication protocol described herein, which utilize the Wi-Fi, cellular and/or Bluetooth™ communication protocols described herein and/or which utilize any other communication protocol described herein, any action requested by the user via the mobile device application requires a new engagement between the mobile device and the component of the fund management system, the component of the ticket voucher system, the component of the banking network interface system, and/or the gaming establishment device, such as a new tap of the mobile device to a card reader or other designated location(s) of the component of the fund management system, the component of the ticket voucher system, the component of the banking network interface system, and/or the gaming establishment device. In certain other embodiments which utilize the NFC communication protocol described herein, which utilize the Wi-Fi, cellular and/or Bluetooth™ communication protocols described herein and/or which utilize any other communication protocol described herein, certain actions requested by the user via the mobile device application requires a new engagement between the mobile device and the component of the fund management system, the component of the ticket voucher system, the component of the banking network interface system, and/or the gaming establishment device, such as a new tap of the mobile device to a card reader or other designated location(s) of the component of the fund management system, the component of the ticket voucher system, the component of the banking network interface system, and/or the gaming establishment device and other actions requested by the user via the mobile device application do not require any new engagement between the mobile device and the component of the fund management system, the component of the ticket voucher system, the component of the banking network interface system, and/or the gaming establishment device.

It should be appreciated that while certain data or information pertaining to one or more of the requested actions are communicated between a component of the fund management system, the component of the ticket voucher system, the component of the banking network interface system, and/or the gaming establishment device and a mobile device, such data or information may additionally or alternatively be communicated: (i) between one or more servers and a mobile device via one or more wireless communication protocols, or (ii) between a component of the fund management system, the component of the ticket voucher system, the component of the banking network interface system, and/or the gaming establishment device and one or more servers via one or more wireless communication protocols and then from one or more servers to a mobile device via one or more wireless communication protocols.

In certain embodiments, the above-described embodiments of the present disclosure may be implemented in accordance with or in conjunction with: (i) zero, one or more components of a fund management system, (ii) zero, one or more components of a ticket voucher system, (iii) zero, one or more components of a banking network interface system, and/or (iv) zero, one or more gaming establishment devices (e.g., a gaming device such as an EGM or a non-gaming device such as a kiosk or point-of-sale terminal operable to facilitate the purchase of a ticket voucher with funds from an external account). In these embodiments, such components of the fund management system and/or the gaming establishment device each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the fund management system, the component of the ticket voucher system, the component of the banking network interface system, and/or the gaming establishment device; (3) accessing memory to configure or reconfigure parameters in the memory according to indicia read from the component of the fund management system, the component of the ticket voucher system, the component of the banking network interface system, and/or the gaming establishment device; (4) communicating with interfaces and the peripheral devices (such as input/output devices); and/or (5) controlling the peripheral devices. In certain embodiments, one or more components of the controller (such as the at least one processor) reside within a housing of the component of the fund management system, the component of the ticket voucher system, the component of the banking network interface system, and/or the gaming establishment device, while in other embodiments, at least one component of the controller resides outside of the housing of the component of the fund management system, the component of the ticket voucher system, the component of the banking network interface system, and/or the gaming establishment device.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the fund management system, the component of the ticket voucher system, the component of the banking network interface system, and/or the gaming establishment device disclosed herein. In certain embodiments, the at least one memory device resides within the housing of the component of the fund management system, the component of the ticket voucher system, the component of the banking network interface system, and/or the gaming establishment device, while in other embodiments at least one component of the at least one memory device resides outside of the housing of the component of the fund management system, the component of the ticket voucher system, the component of the banking network interface system, and/or the gaming establishment device. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the fund management system, the component of the ticket voucher system, the component of the banking network interface system, and/or the gaming establishment device; (2) associations between configuration indicia read from a component of the fund management system with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the fund management system, the component of the ticket voucher system, the component of the banking network interface system, and/or the gaming establishment device to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the fund management system, the component of the ticket voucher system, the component of the banking network interface system, and/or the gaming establishment device to control the component of the fund management system, the component of the ticket voucher system, the component of the banking network interface system, and/or the gaming establishment device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a component of the fund management system to implement at least part of the present disclosure. In other embodiments, part or all of the program code and/or the operating data is downloaded to the at least one memory device of the component of the fund management system, the component of the ticket voucher system, the component of the banking network interface system, and/or the gaming establishment device through any suitable data network described above (such as an Internet or intranet).

The at least one memory device also stores a plurality of device drivers. Examples of different types of device drivers include device drivers for the component of the fund management system, the component of the ticket voucher system, the component of the banking network interface system, and/or the gaming establishment device and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the fund management system, the component of the ticket voucher system, the component of the banking network interface system, and/or the gaming establishment device. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the fund management system, the component of the ticket voucher system, the component of the banking network interface system, and/or the gaming establishment device loads the new device driver from the at least one memory device to enable communication with the new device. For instance, one type of card reader in the component of the fund management system, the component of the ticket voucher system, the component of the banking network interface system, and/or the gaming establishment device can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the component of the fund management system, the component of the ticket voucher system, the component of the banking network interface system, and/or the gaming establishment device and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

The at least one output device includes at least one display device configured to display any suitable information. In certain embodiments, the display devices are connected to or mounted on a housing of the component of the fund management system, the component of the ticket voucher system, the component of the banking network interface system, and/or the gaming establishment device. In various embodiments, the display devices serve as digital glass configured to aspects of the gaming establishment in which the component of the fund management system, the component of the ticket voucher system, the component of the banking network interface system, and/or the gaming establishment device is located. In various embodiments, the component of the fund management system, the component of the ticket voucher system, the component of the banking network interface system, and/or the gaming establishment device includes zero, one or more of the following display devices: (a) a central display device; (b) a player tracking display configured to display various information regarding a user's player tracking status; (c) a secondary or upper display device in addition to the central display device and the player tracking display; (d) a credit display configured to display a current quantity of credits, amount of cash, account balance, or the equivalent; and (e) a bet display. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In various embodiments, the at least one output device includes a payout device. In these embodiments, after the component of the fund management system, the component of the ticket voucher system, the component of the banking network interface system, and/or the gaming establishment device receives an actuation, the component of the fund management system, the component of the ticket voucher system, the component of the banking network interface system, and/or the gaming establishment device causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

In certain embodiments, the at least one output device is a sound generating device controlled by one or more sound cards. In one such embodiment, the sound generating device includes one or more speakers or other sound generating hardware and/or software configured to generate sounds, such as by playing music. In another such embodiment, the component of the fund management system, the component of the ticket voucher system, the component of the banking network interface system, and/or the gaming establishment device provides dynamic sounds coupled with attractive multimedia images displayed on one or more of the display devices to provide an audio-visual representation or to otherwise display full-motion video with sound to attract players to the component of the fund management system, the component of the ticket voucher system, the component of the banking network interface system, and/or the gaming establishment device. In certain embodiments, the component of the fund management system, the component of the ticket voucher system, the component of the banking network interface system, and/or the gaming establishment device displays a sequence of audio and/or visual attraction messages during idle periods to attract potential players to the component of the fund management system, the component of the ticket voucher system, the component of the banking network interface system, and/or the gaming establishment device. The videos may be customized to provide any appropriate information.

The at least one input device may include any suitable device that enables an input signal to be produced and received by the at least one processor of the component of the fund management system, the component of the ticket voucher system, the component of the banking network interface system, and/or the gaming establishment device. In one embodiment, the at least one input device includes a payment device configured to communicate with the at least one processor of the component of the fund management system, the component of the ticket voucher system, the component of the banking network interface system, and/or the gaming establishment device to fund the component of the fund management system, the component of the ticket voucher system, the component of the banking network interface system, and/or the gaming establishment device. In certain embodiments, the payment device includes zero, one or more of: (a) a bill acceptor into which paper money is inserted; (b) a ticket acceptor into which a ticket or a voucher is inserted; (c) a reader or a validator for credit cards, debit cards, or credit slips into which a credit card, debit card, or credit slip is inserted; (d) a player identification card reader into which a player identification card is inserted; or (e) any suitable combination thereof. In one embodiment, the at least one input device includes a payment device configured to enable the component of the fund management system, the component of the ticket voucher system, the component of the banking network interface system, and/or the gaming establishment device to be funded via an electronic funds transfer, such as a transfer of funds from a bank account. In another embodiment, the component of the fund management system, the component of the ticket voucher system, the component of the banking network interface system, and/or the gaming establishment device includes a payment device configured to communicate with a mobile device of a player, such as a mobile phone, a radio frequency identification tag, or any other suitable wired or wireless device, to retrieve relevant information associated with that player to fund the component of the fund management system, the component of the ticket voucher system, the component of the banking network interface system, and/or the gaming establishment device. When the component of the fund management system, the component of the ticket voucher system, the component of the banking network interface system, and/or the gaming establishment device is funded, the at least one processor determines the amount of funds entered and displays the corresponding amount.

In various embodiments, the at least one input device includes a plurality of buttons that are programmable by the component of the fund management system, the component of the ticket voucher system, the component of the banking network interface system, and/or the gaming establishment device operator to, when actuated, cause the component of the fund management system, the component of the ticket voucher system, the component of the banking network interface system, and/or the gaming establishment device to perform particular functions. For instance, such buttons may be hard keys, programmable soft keys, or icons icon displayed on a display device of the component of the fund management system, the component of the ticket voucher system, the component of the banking network interface system, and/or the gaming establishment device that are actuatable via a touch screen of the component of the fund management system, the component of the ticket voucher system, the component of the banking network interface system, and/or the gaming establishment device or via use of a suitable input device of the component of the fund management system, the component of the ticket voucher system, the component of the banking network interface system, and/or the gaming establishment device. In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the component of the fund management system, the component of the ticket voucher system, the component of the banking network interface system, and/or the gaming establishment device by touching the touch screen at the appropriate locations.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the component of the fund management system, the component of the ticket voucher system, the component of the banking network interface system, and/or the gaming establishment device. In one embodiment, a user input device docking region is provided, and includes a power distribution component that is configured to recharge a user input device without requiring metal-to-metal contact. In one embodiment, the at least one power distribution component is configured to distribute power to one or more internal components of the component of the fund management system, the component of the ticket voucher system, the component of the banking network interface system, and/or the gaming establishment device, such as one or more rechargeable power sources (e.g., rechargeable batteries) located at the component of the fund management system, the component of the ticket voucher system, the component of the banking network interface system, and/or the gaming establishment device.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the component of the fund management system, the component of the ticket voucher system, the component of the banking network interface system, and/or the gaming establishment device; detecting the presence and/or identity of various persons (e.g., players, casino employees, etc.), devices (e.g., user input devices), and/or systems within a predetermined proximity to the component of the fund management system, the component of the ticket voucher system, the component of the banking network interface system, and/or the gaming establishment device.

The at least one data preservation component is configured to detect or sense one or more events and/or conditions that, for example, may result in damage to the component of the fund management system, the component of the ticket voucher system, the component of the banking network interface system, and/or the gaming establishment device and/or that may result in loss of information associated with the component of the fund management system, the component of the ticket voucher system, the component of the banking network interface system, and/or the gaming establishment device. Additionally, the data preservation system may be operable to initiate one or more appropriate action(s) in response to the detection of such events/conditions.

The at least one motion/gesture analysis and interpretation component is configured to analyze and/or interpret information relating to detected player movements and/or gestures to determine appropriate player input information relating to the detected player movements and/or gestures. For example, in one embodiment, the at least one motion/gesture analysis and interpretation component is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source enables the component of the fund management system, the component of the ticket voucher system, the component of the banking network interface system, and/or the gaming establishment device to operate in a mobile environment.

The at least one geolocation module is configured to acquire geolocation information from one or more remote sources and use the acquired geolocation information to determine information relating to a relative and/or absolute position of the component of the fund management system, the component of the ticket voucher system, the component of the banking network interface system, and/or the gaming establishment device. For example, in one implementation, the at least one geolocation module is configured to receive GPS signal information for use in determining the position or location of the component of the fund management system, the component of the ticket voucher system, the component of the banking network interface system, and/or the gaming establishment device. In another implementation, the at least one geolocation module is configured to receive multiple wireless signals from multiple remote devices (e.g., the component of the fund management system, the component of the ticket voucher system, the component of the banking network interface system, and/or the gaming establishment device, servers, wireless access points, etc.) and use the signal information to compute position/location information relating to the position or location of the component of the fund management system, the component of the ticket voucher system, the component of the banking network interface system, and/or the gaming establishment device.

The at least one user identification module is configured to determine the identity of the current user or current owner of the component of the fund management system, the component of the ticket voucher system, the component of the banking network interface system, and/or the gaming establishment device. For example, in one embodiment, the current user is required to perform a login process at the component of the fund management system, the component of the ticket voucher system, the component of the banking network interface system, and/or the gaming establishment device in order to access one or more features. Alternatively, the component of the fund management system, the component of the ticket voucher system, the component of the banking network interface system, and/or the gaming establishment device is configured to automatically determine the identity of the current user based on one or more external signals, such as an RFID tag or badge worn by the current user and that provides a wireless signal to the component of the fund management system, the component of the ticket voucher system, the component of the banking network interface system, and/or the gaming establishment device that is used to determine the identity of the current user. In at least one embodiment, various security features are incorporated into the component of the fund management system, the component of the ticket voucher system, the component of the banking network interface system, and/or the gaming establishment device to prevent unauthorized users from accessing confidential or sensitive information.

The at least one information filtering module is configured to perform filtering (e.g., based on specified criteria) of selected information to be displayed at one or more displays of the component of the fund management system, the component of the ticket voucher system, the component of the banking network interface system, and/or the gaming establishment device.

In various embodiments, the component of the fund management system, the component of the ticket voucher system, the component of the banking network interface system, and/or the gaming establishment device includes a plurality of communication ports configured to enable the at least one processor of the component of the fund management system, the component of the ticket voucher system, the component of the banking network interface system, and/or the gaming establishment device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, the component of the fund management system, the component of the ticket voucher system, the component of the banking network interface system, and/or the gaming establishment device has a support structure, housing, or cabinet that provides support for a plurality of the input devices and the output devices of the component of the fund management system, the component of the ticket voucher system, the component of the banking network interface system, and/or the gaming establishment device.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A gaming establishment fund management system comprising:
   a processor; and
   a memory device that stores a plurality of instructions that, when executed by the processor responsive to a request received from a user to purchase an anonymous ticket voucher associated with an amount of funds, cause the processor to:
      interface with a server of a financial institution to communicate data associated with the amount of funds, and data associated with a financial account associated with the user, wherein the financial account is maintained by the financial institution independent of any gaming establishment, and
      responsive to a completion of a transfer of the amount of funds from the financial account, independent of identifying the user to any gaming establishment patron management system and in compliance with a gaming establishment anti-money laundering regulatory obligation to identifier users associated with an electronic fund transfer involving the gaming establishment:
         interface with a gaming establishment ticket voucher system to cause, based on the amount of funds, a modification of an account associated with the gaming establishment ticket voucher system, and
         interface with the gaming establishment ticket voucher system to cause a creation; of the anonymous ticket voucher associated with the amount of funds, wherein the created anonymous ticket voucher is redeemable at at least an electronic gaming machine to increase, based on the amount of funds, a credit balance of the electronic gaming machine to enable a wager of at least a portion of the amount of funds.

2. The gaming establishment fund management system of claim 1, wherein the anonymous ticket voucher comprises an anonymous paper ticket voucher.

3. The gaming establishment fund management system of claim 2, wherein the created anonymous paper ticket voucher is distributed to the user via a ticket voucher printer of a kiosk.

4. The gaming establishment fund management system of claim 1, wherein the anonymous ticket voucher comprises an anonymous virtual ticket voucher.

5. The gaming establishment fund management system of claim 4, wherein the anonymous virtual ticket voucher is distributed to the user via a communication of data associated with the anonymous virtual ticket voucher to a mobile device associated with the user.

6. The gaming establishment fund management system of claim 4, wherein the anonymous virtual ticket voucher is distributed to the user via a communication of any of an email associated with the anonymous virtual ticket voucher and an SMS message associated with the anonymous virtual ticket voucher.

7. The gaming establishment fund management system of claim 1, wherein the request received from the user comprises data received from a mobile device.

8. The gaming establishment fund management system of claim 1, wherein the request received from the user comprises data received, via an input device, of a kiosk.

9. The gaming establishment fund management system of claim 1, wherein the interface with the server of the financial institution occurs via a server of a financial institution network interface system.

10. A ticket voucher system comprising:
a processor; and
a memory device that stores a plurality of instructions that, when executed by the processor, cause the processor to:
receive, from a server of a gaming establishment fund management system, data associated with an amount of funds transferred from a financial account associated with a user, wherein the financial account is maintained by a financial institution independent of any gaming establishment, and
following a modification of an account associated with the ticket voucher system based on the amount of funds transferred from the financial account associated with the user, create an anonymous ticket voucher associated with a value corresponding to the amount of funds transferred from the financial account and redeemable at at least an electronic gaming machine operable to enable a wager of at least a portion of the associated value, wherein the anonymous ticket voucher is created independent of identifying the user to any gaming establishment patron management system and in compliance with a gaming establishment anti-money laundering regulatory obligation to identifier users associated with an electronic fund transfer involving the gaming establishment.

11. The ticket voucher system of claim 10, wherein the anonymous ticket voucher comprises a virtual ticket voucher.

12. A method of operating a gaming establishment fund management system, the method comprising:
responsive to a request received from a user to purchase an anonymous ticket voucher associated with an amount of funds:
communicating, to a server of a financial institution, data associated with the amount of funds, and data associated with a financial account associated with the user, wherein the financial account is maintained by the financial institution independent of any gaming establishment, and
responsive to a completion of a transfer of the amount of funds from the financial account, independent of identifying the user to any gaming establishment patron management system and in compliance with a gaming establishment anti-money laundering regulatory obligation to identifier users associated with an electronic fund transfer involving the gaming establishment:
causing, by a processor and based on the amount of funds, a modification of an account associated with a gaming establishment ticket voucher system, and
causing, by the gaming establishment ticket voucher system, a creation of the anonymous ticket voucher associated with the amount of funds, wherein the created anonymous ticket voucher is redeemable at at least an electronic gaming machine to increase, based on the amount of funds, a credit balance of the electronic gaming machine to enable a wager of at least a portion of the amount of funds.

13. The method of claim 12, wherein the anonymous ticket voucher comprises an anonymous paper ticket voucher.

14. The method of claim 13, further comprising distributing the created anonymous paper ticket voucher to the user via a ticket voucher printer of a kiosk.

15. The method of claim 12, wherein the anonymous ticket voucher comprises an anonymous virtual ticket voucher.

16. The method of claim 15, further comprising distributing the anonymous virtual ticket voucher to the user via a communication of data associated with the anonymous virtual ticket voucher to a mobile device associated with the user.

17. The method of claim 15, further comprising distributing the anonymous virtual ticket voucher to the user via a communication of any of an email associated with the anonymous virtual ticket voucher and an SMS message associated with the anonymous virtual ticket voucher.

18. The method of claim 12, wherein the request received from the user comprises data received from a mobile device.

19. The method of claim 12, wherein the request received from the user comprises data received, via an input device, of a kiosk.

20. The method of claim 12, wherein the communication to the server of the financial institution occurs in association with a server of a financial institution network interface system.

* * * * *